United States Patent
Sobchak et al.

(10) Patent No.: US 7,324,616 B2
(45) Date of Patent: Jan. 29, 2008

(54) LOW COST AND HIGH PERFORMANCE NARROWBAND INTERFERENCE CANCELLATION SYSTEM

(75) Inventors: Charles L. Sobchak, Davie, FL (US); Mahibur Rahman, Lake Worth, FL (US); David R. Haub, San Diego, CA (US); Louis J. Vannatta, Crystal Lake, IL (US)

(73) Assignee: Motorola, Inc., Libertyville, IL (US)

( * ) Notice: Subject to any disclaimer, the term of this patent is extended or adjusted under 35 U.S.C. 154(b) by 722 days.

(21) Appl. No.: 10/790,168

(22) Filed: Mar. 1, 2004

(65) Prior Publication Data

US 2005/0190867 A1   Sep. 1, 2005

(51) Int. Cl.
  H03D 1/04   (2006.01)
(52) U.S. Cl. .............. 375/346; 375/144; 375/229; 375/316; 375/350; 455/67.11; 455/63.1; 455/522
(58) Field of Classification Search ............... 375/346, 375/347, 348, 350, 316, 143, 152, 234, 229; 455/67.11, 63.1, 522
See application file for complete search history.

(56) References Cited

U.S. PATENT DOCUMENTS

| | | | | |
|---|---|---|---|---|
| 6,115,614 | A * | 9/2000 | Furukawa | 455/525 |
| 6,192,067 | B1 * | 2/2001 | Toda et al. | 375/144 |
| 6,426,983 | B1 * | 7/2002 | Rakib et al. | 375/346 |
| 7,092,352 | B2 * | 8/2006 | Shattil | 370/210 |
| 2001/0050987 | A1 * | 12/2001 | Yeap et al. | 379/399.01 |
| 2002/0006174 | A1 * | 1/2002 | Nafie et al. | 375/346 |
| 2002/0087199 | A1 | 7/2002 | Bange et al. | 607/27 |
| 2003/0119450 | A1 | 6/2003 | Vannatta et al. | 455/67.1 |
| 2003/0179840 | A1 | 9/2003 | Oh et al. | |
| 2004/0008765 | A1 * | 1/2004 | Chung et al. | 375/233 |

FOREIGN PATENT DOCUMENTS

| | | |
|---|---|---|
| WO | WO 01/78242 A | 10/2001 |
| WO | WO 03/90422 A | 10/2003 |

* cited by examiner

*Primary Examiner*—Chieh M. Fan
*Assistant Examiner*—Siu M Lee
(74) *Attorney, Agent, or Firm*—John A. Fortkort; Fortkort & Houston P.C.

(57) ABSTRACT

A narrowband interference cancellation system, method and digital signal processor is disclosed that removes narrowband interference in wide band communication systems. The system includes a narrowband processing component, wideband processing component, soft metric generator and at least one filter. The system is configured to receive a signal, identify one or more narrowband interferers in the received signal and filter out identified narrowband interferers. The narrowband processing component includes a filter bank configured to separate the received signal into a predetermined number of channel bands and identify a band with interference. The wide band processing component provides an average level for an unfiltered version of the received signal. The soft decision metric generator produces metrics based on predetermined thresholds. The filters receive coefficients that are determined using outputs from the soft decision metric generator that are first averaged using long term integrators and then stored in lookup tables.

37 Claims, 7 Drawing Sheets

LOW COST AND HIGH PERFORMANCE NARROWBAND INTERFERENCE CANCELLATION SYSTEM

FIELD OF THE INVENTION

This invention pertains to wireless technologies, and more particularly, to narrowband interference suppression systems for use in receivers.

BACKGROUND OF THE INVENTION

Cellular systems require architectures that enable cost effective solutions for providing clear communication. Parameters that insure clear communication include having a high signal to interference level and having a low bit error rate (BER). The methods for reducing BER and achieving appropriate signal to interference levels depend on the communication system employed. For example, non-linear second and third order intermodulation distortion products (IDPs) frequently occur in direct conversion receivers. The IDPs are caused by the non-linearities of the analog circuitry in the communication system and occur due to the modulation of the signal, interference and noise components at all frequencies and can occur in the band of interest.

In wide band systems such as wide band code division multiple access systems, (WCDMA), narrowband interference can occur due to signals overlaying a frequency band in which there already exists other narrowband channels, such as Advanced Mobile Phone System (AMPS), Global System for Mobile Communications (GSM) and Enhanced Data for GSM Evolution (EDGE), for example.

The invention provides a method and system for addressing narrowband interference by a cancellation system that suppresses narrowband interference(s) in a wide band receiver. This advantage and other advantages of the invention, as well as additional inventive features, will be apparent from the description of the invention provided herein.

BRIEF SUMMARY OF THE INVENTION

The invention is a narrowband interference cancellation system, method and digital signal processor that removes narrowband interference in wide band communication systems like Code Division Multiple Access (CDMA) systems. The system includes a narrowband processing component, wideband processing component, soft metric generator and at least one filter. The system is configured to receive a signal, identify one or more narrowband interferers in the received signal and filter out identified narrowband interferers.

The narrowband processing component includes a filter bank configured to separate the received signal into a predetermined number of channel bands and identify a band with interference. The separated signals are received by magnitude estimators and then short term integrators that provide an average magnitude for each separated signal so that the band with the interference can be identified in the soft metric decision generator.

The wide band processing component provides an average level for an unfiltered version of the received signal by using a magnitude estimator and short term integrator operating on the received signal without separation into channels. The soft decision metric generator receives the averaged magnitudes from both wideband and narrowband produces metrics based on predetermined thresholds. The filters receive coefficients that are determined using outputs from the soft decision metric generator that are first averaged using long term integrators and then stored in lookup tables.

Other aspects, objectives and advantages of the invention will become more apparent from the following detailed description when taken in conjunction with the accompanying drawings.

DETAILED DESCRIPTION OF THE INVENTION

Figure 1:
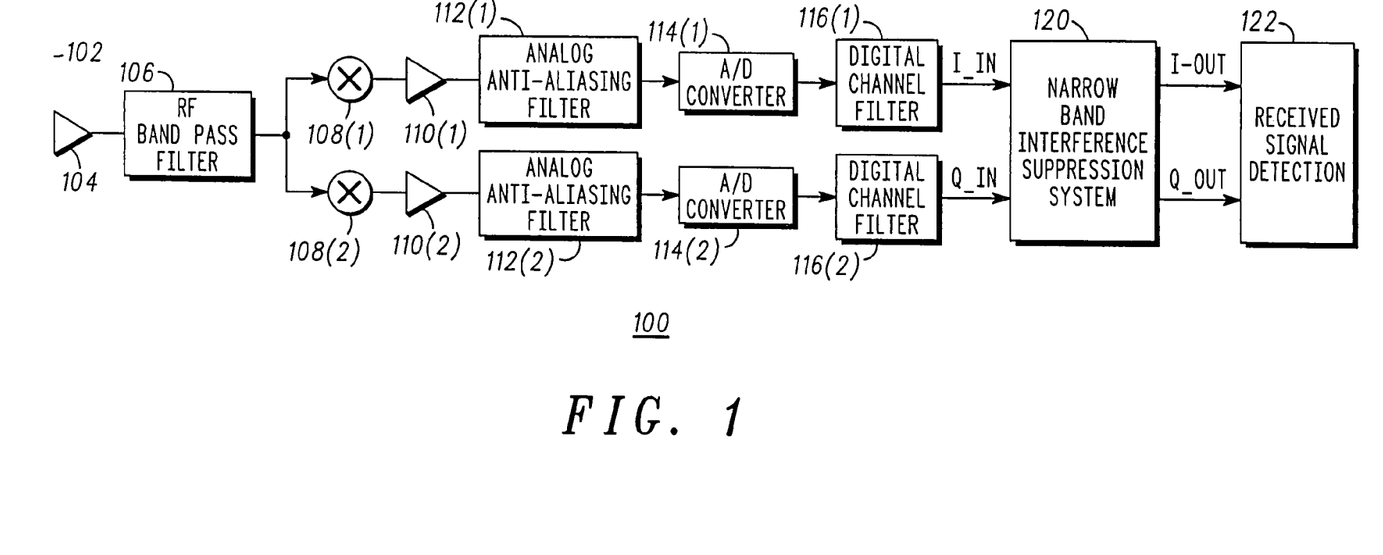
FIG. 1 is a block diagram illustrating the location of a narrowband interference suppression system within a receiver according to an embodiment of the present invention.

Referring now to FIG. 1, a block diagram of a receiver 100 incorporating a narrowband interference suppression system is illustrated. Receiver 100 includes an antenna 102 coupled to an analog amplifier 104 to amplify a received wideband signal. The amplified signal is filtered by band pass filter 106 and then received by mixers 108(1,2) which separates the filtered signal into real and quadrature signals at baseband and high frequencies. Amplifiers 110(1,2) receive the baseband and high frequency signals so that analog low pass filters 112(1,2) can remove signals outside the baseband frequencies, including the high frequency signals generated by mixers 108(1,2). The analog signal output from the low pass filters 112 becomes a digital signal via analog to digital components 114(1,2). A digital low pass filter 116(1,2) receives the digital signals and feeds the real and quadrature signals (I_IN and Q_IN) to narrowband interference suppression system 120, which dynamically suppresses identified narrowband interference and outputs the real and quadrature digital signals to digital receiver 122.

Figure 2:
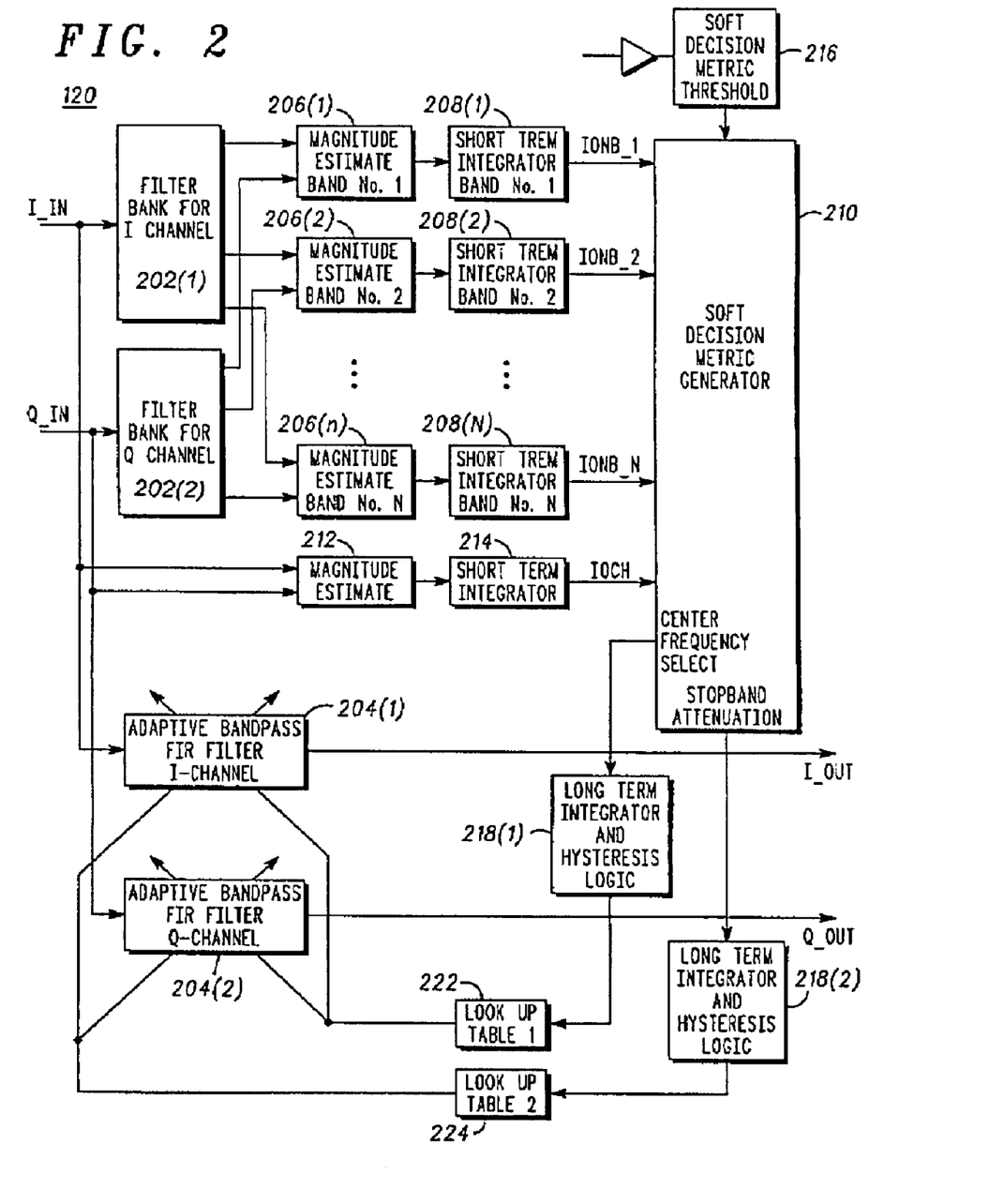
FIG. 2 is a block diagram of a narrowband interference suppression system according to an embodiment of the present invention.

Referring now to FIG. 2, a block diagram illustrates an embodiment of a narrowband interference suppression system 120 according to an embodiment. As shown, real and quadrature signals I_IN and Q_IN are received at filter banks 202(1,2), and at adaptive bandpass finite impulse response (FIR) filters 204(1,2). Filter banks 202(1,2) each separate the real and quadrature signals into bands 1:$n$. In general bands 1:$n$ can be approximately equal in width, and they together cover the desired signal's bandwidth of interest. In an embodiment, the filter banks include a predetermined number of adjacent narrowband filters, which can be implemented as polyphase filter structures for efficiency. Other types of filter banks can be used as will be appreciated by one of ordinary skill in the art with the benefit of this disclosure.

Signals in bands 1:$n$ are each received at magnitude estimate components 206(1:$n$), each of which receives corresponding I and Q signals for each band 1:$n$, approximates the magnitude of complex signal formed by the I and Q signals by performing an absolute value of the I and Q signals and adding the larger absolute value of the two signals to ¼ of the smaller absolute value of the two signals. The estimate of the absolute value of the complex signal from the Mth filter bank, where M is a fixed number between 1 and N, provides an instantaneous estimate of the signal level of the interference, signal, and noise in the Mth band. This instantaneous signal level is then passed to short term integrators 208(1:N) which produce an output proportional to the average of the signal level over the period of the integration. The period of the integration is chosen such that the signal strength of any found narrowband interferers in each band can be rapidly tracked given each narrowband interferer has a distinct multipath fading profile versus that of the desired on-channel signal. Thus, bands with a high slew rate can be quickly identified. Components 202, 206 and 208 each operate on the narrowband components of the received signal, and can be referred to as a narrowband processing component.

The output of short term integrators 208(1:N) is received at soft decision metric generator 210. Soft decision metric generator 210 can be implemented as a low cost and power efficient employed to generate "soft metrics" that are used to "notch out" a narrowband interferences centered at any given in-band location.

In addition to receiving outputs from short term integrators 208(1:$n$), soft decision metric generator 210 also receives an average level of the signal unfiltered. More particularly, the unfiltered signal is received at magnitude estimate component 212, where the magnitude of the signal is determined and fed to short term integrator 214. Short term integrator 214 determines the average of the overall unfiltered signal. The output of short term integrator 214 is fed to soft decision metric generator 210. Components 212 and 214 together provide a wideband processing component because they operate on the entire on-channel received signal.

Soft decision metric generator 210 also receives soft decision metric thresholds 216.

Soft decision metric generator 210 generates (multiple) multi-bit soft decision metrics that include a center frequency select soft metric and/or a stop-band attenuation soft metric (for each interferer). The center frequency select metric adjusts the center frequency of the filter such that the the narrowband interferences are sufficiently attenuated. The stopband attenuation soft metric determines the amount of selectivity (i.e., stopband attenuation) in the adaptive bandpass filter shown to notch out the narrowband interferences. The center frequency select soft metric and the stopband attenuation soft metric are first averaged in long term integrators 218(1,2), then passed through lookup tables (222 and 224) before being fed into adaptive bandpass filters 204(1,2). More specifically, long term integrator 218(1) receives a center frequency select, which selects all but a center frequency tap in the case when bandpass "FIR" filters are used. Long term integrator 218(1) operates on the soft metrics to avoid rapid changes in the choice of coefficients to be used in adaptive bandpass filters 204(1,2).

While operating in a low bandwidth mode, this integrator averages the soft decisions to prevent chatter or bounce between adjacent coefficient levels at a rapid rate. Such chatter between adjacent coefficient levels during steady state operation can degrade the performance of the receiver since it can cause a dithered frequency response. In one embodiment, hysterisis is employed to reduce the chatter in the outputs of integrators 218(1,2).

Long term integrator(s) 218(2) receives stopband attenuation metric(s) that changes the level of the center frequency tap. Look up table 1 (222) receives non-center tap signals, and look up table 2 (224) receives a center tap signal. Look up table 1 determines the amount by which all taps but the center tap should be adjusted, and look up table 2 determines thee amount by which the center tap should be adjusted.

The outputs of look up tables 1 and 2, 222 and 224, which together provide adjustments to all taps, are received by each adaptive bandpass filter 204(1,2). Bandpass filters 204(1,2) also receive the real and quadrature components of the signal, as shown. Adaptive bandpass filters 204(1,2) can be implemented as FIR filters or other appropriate filter depending on system requirements, as one of skill in the art will appreciate. In certain circumstances, for example, an infinite impulse response (IIR) filter could be appropriate.

More specifically, several methods for using an IIR filter are possible and within the scope of the present invention. One method, for example, that provides varying levels of stop band attenuation is to store several sets of filter coefficients, one set for each desired attenuation level in a given frequency band. Each set of filter coefficients can be configured to be selected to provide a desired stop band and the desired level of attenuation. In this embodiment, the system stores a set of filter coefficients for each frequency band. For example, if the system uses N frequency bands with M attenuation levels, then the system stores M*N coefficient sets.

Alternatively, the system could generate IIR filter coefficients when the center frequency metric or the stopband attenuation metric changes using a digital signal processor or custom hardware to implement an algorithm that generates IIR filter coefficients.

A third method to change the stopband attenuation is to cascade M IIR filters for which m<=M are used. If all these filters use the same filter coefficients, then the total attenuation is m times the attenuation of a single filter. For example, if filter coefficients are selected, by for example soft metric generator 210, to provide five dB of attenuation and M=4, then, by selecting m=1, 2, 3, or 4, attenuations of 5, 10, 15, or 20 dB can be realized. Although the M filters need not be identical, if the filters are identical, then the same coefficients can be used in each of the M filters. In the case of identical filters using the same coefficients, only N sets of filter coefficients need be stored, one set for each frequency band.

Although each of the above methods use IIR filters, each may require storage of more sets of coefficients or the use of additional filters, IIR filters can, in general, realize a given performance specification with far fewer coefficients than an FIR filter, as will be appreciated by one of skill in the art.

Figure 3:
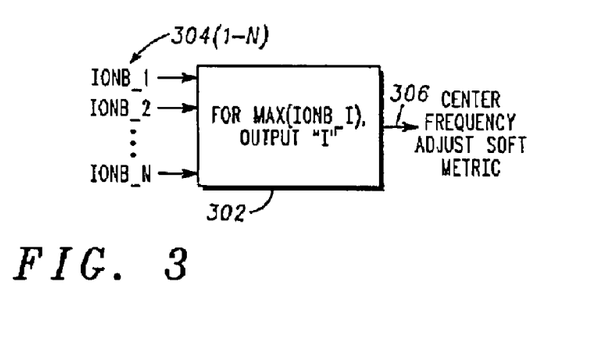
FIG. 3 is a block diagram illustrating generation of the center frequency adjust soft metric in accordance with an embodiment of the present invention.

Referring now to FIG. 3, a block diagram illustrates generation of the center frequency adjust soft metric. As shown, a center frequency adjust is generated by outputting the index of the narrow band filter bank which exhibits the highest energy over a specified short term integration period as shown in block 302, which receives the averaged magnitude for each narrow frequency band Ionb_1 through Ionb_N 304, and determines which band has the maximum averaged magnitude. The index of that maximum band is output as center frequency adjust soft metric 306. Specifically, the center frequency adjust metric represents the narrowband filter bank that exhibits the highest energy over a specified short term integration period.

Figure 4:
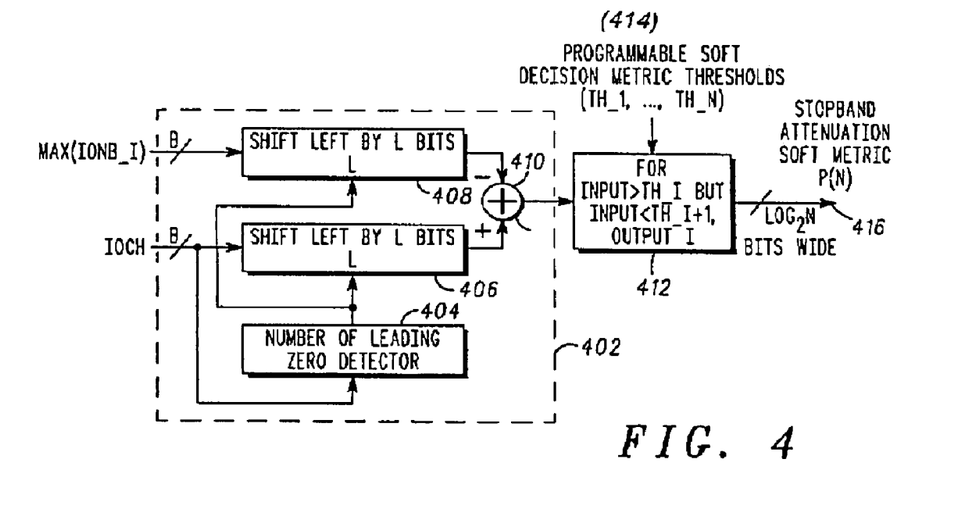
FIG. 4 is a block diagram illustrating generation of a stopband attenuation soft metric in accordance with an embodiment of the present invention.

Referring now to FIG. 4, a block diagram illustrates generation of a stopband attenuation soft metric. As shown, normalization component 402 receives the identified maximum band determined as part of the calculation of the center frequency adjust soft metric. Normalization component 402 also receives the signal representing the averaged unfiltered signal, noise and interference, Ioch. Normalization component 402 outputs a parameter that can be more easily manipulated. Thus, normalization component 402 can be compared to a block that takes a logarithm of a number, for example. More particularly, in the embodiment shown, normalization is accomplished by directing unfiltered signal Ioch to detector 404, which determines the number of leading zeros in Ioch. The output of detector 404 is then shifted left by a predetermined number of bits in blocks 406 and 408. The identified maximum band is received by shift block 408. The output of shift block 408 and 406 is fed to summer 410, which acts as a division function operating on the normalized interferer magnitude and the normalized unfiltered signal. More particularly, summer 410 operates to subtract the normalized interferer magnitude from that of the normalized total on-channel signal magnitude. Multi-bit comparator 412 receives the output of normalization component 402 as well as programmable soft decision metric thresholds (TH_1:N) 414. Multi-bit comparator 412 compares the output of normalization component 402 to thresholds 414. Thresholds 414 can be pre-programmed by a user, outside determination mechanism or the like. A soft metric is generated based on the threshold window for which the output of summer 410 matches. The result 416 represents a soft indication of an amount by which stopband attenuation is necessary. The number of regions (n) is reflected in the soft metric as the length of the result will be $\log_2 N$ bits wide.

Multi-bit comparator 412 can be used to control the cutoff (3 dB corner) of the high pass filter. The soft decision metric block can compare Iodc and Ioch in many ways. If p(n) has only two states, it is just an off/on switch. In this case, an embodiment can provide for multiplying the interference by a preset gain, Iodc*G, and compare it to the total energy of the band, Ioch to make a decision whether or not to turn on the filter. If a system requires more than two states the comparison can be done between the interference and the total in-channel signal with the interfering band subtracted. FIG. 4 illustrates a comparison of Iosig to Iodc, wherein Iosig=Ioch−Iodc. For example, in one implementation, an output signal p(n) is based on high pass filter coefficients as follows:

If Iodc is greater than Iosig+14 dB, p(n)=4 (this sets FIR center tap to highest filter selectivity)

If Iodc is less than Iosig+14 dB, but greater than Iosig+7 dB, p(n)=3

If Iodc is less than Iosig+7 dB, but greater than Iosig+2 dB, p(n)=2

If Iodc is less than Iosig+2 dB, but greater than Iosig−2 dB, p(n)=1

If Iodc is less than Iosig−2 dB, p(n)=0 (this sets FIR center tap to least filter selectivity or alternatively bypasses the filter altogether)

Figure 5:
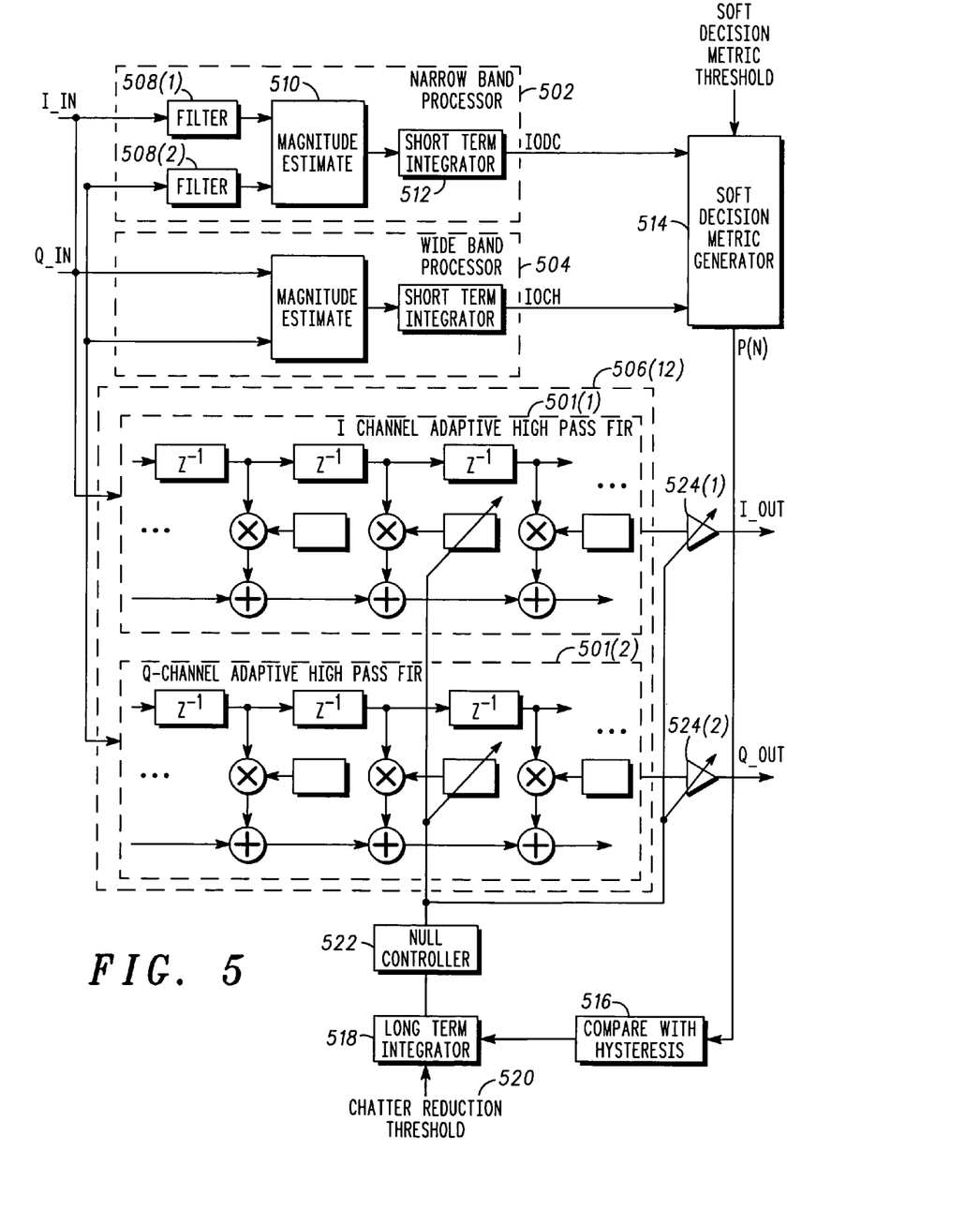
FIG. 5 is a block diagram illustrating a narrowband interference cancellation system appropriate for distortion of baseband signals in accordance with an embodiment of the present invention.

Referring now to FIG. 5, a block diagram illustrates another embodiment of a narrowband interference cancellation system appropriate for distortion of baseband signals. More particularly, FIG. 5 illustrates a paired down version of FIG. 2 that operates to cancel intermodulation distortion that affect baseband signals. For example, in direct conversion receivers, second order intermodulation distortion (IMD2) can cause problems with analog mixers and other types of analog circuitry do not have acceptable IP2 specifications or if the analog filtering does not sufficiently suppress near-in interferences. The near-in interferences become squared signals by the mixer and will be located at baseband DC. For example, for Third Generation (3G), and Universal Mobile Telecommunications Systems (UMTS) IMD can be due to a strong EDGE interferer residing within the anti-aliasing filter's bandwidth. This produces a strong interference centered at DC. Because EDGE modulation is not a constant envelope, the IMD signal located at DC will have modulation components along with the carrier. The modulation with the carrier occupies sizeable bandwidth and cannot be sufficiently suppressed by simple DC offset correction circuitry. The interference can severely degrade the signal to noise ratio of the receiver.

As shown, the inputs to the system are received by the suppression system and include narrowband processing block 502, wide band processing block 504, and adaptive high pass filters 506. Narrowband processing block 502 can be implemented as a reduced version of the narrowband processing components shown in FIG. 2 to process the interference. More specifically, filter banks 202(1,2) shown in FIG. 2 can be implemented as low pass filters 508(1,2). For IP2 interference, a simple infinite impulse response (IIR) low pass filter covering approximately 200 kHz would be appropriate for IP2 interference generated due to an EDGE narrowband interferer because about 99.6% of EDGE-type IP2 interference is located within 200 kHz. Conversely, the IIR filter would attenuate most of a desired WCDMA signal which occupies 1.92 MHz.

As one of skill in the art will appreciate, filter banks can be reduced to provide a real and quadrature signal output as shown as the outputs from low pass filters 508(1,2) in FIG. 5. Using filter banks instead of low pass filters can implemented to better isolate the IMD signal, or other more complex low pass filters The real and quadrature signals are received at magnitude estimator 510, which outputs the magnitude of the filtered signal and provides the magnitude to short term integrator 512, which provides the average magnitude over a specified period of time. Magnitude estimator 510 and short term integrator 512 can be implemented using the architecture described in FIG. 2 by selecting one band from filter banks 202(1,2) rather than a plurality of bands 1-n.

An example of a magnitude approximation equation that can be used instead of a direct power conversion to reduce the complexity is as follows:

$$|R[n]| = \sqrt[2]{I[n]^2 + Q[n]^2} = \text{Max}(|I[n]|, |Q[n]|) + \frac{1}{4}\text{Min}(|I[n]|, |Q[n]|)$$

Following the magnitude approximation is an integrator which can operate in high bandwidth mode for rapid decisions. The first integrator is used to average out the multipath profile. Also under certain situations such as discontinuous receive (DRX) mode it is valuable to make an estimate of the interference within one GSM slot. This can be accomplished by only using the first integrator stage. Using the example that has interference at dc we can assume the integration of Ioch and Iodc in the digital domain can be illustrated as follows, assuming R[n] is a complex input signals and N is the number of samples over which to integrate:

$$I_{och} = \sum_{n}^{n+N} |R[n]|$$

$$I_{odc} = \sum_{n}^{n+N} |LP[R[n]]|$$

FIG. 5 also illustrates that wideband processing block 504 can be implemented using magnitude estimate component 212, and short term integrator 214 shown in FIG. 2 to determine the average of the overall unfiltered signal. The unfiltered signal and the output of short term integrator 512 are received at soft decision metric generator 514, which can be implemented as soft decision metric generator 210 shown in FIG. 2, but utilizing only those components required for stopband attenuation via altering the center tap, and not using those components required to determine an appropriate center frequency. The output of soft decision metric generator 514 is received by long term integrator 516, which provides an average soft attenuation metric over a period of time. Comparator 518 receives the averaged attenuation metric. Comparator 518 functions to compare the relative signal strength of signals Iosig and Iodc Comparator 518 also receives a chatter reduction threshold 520, which functions to reduce chatter by preventing the attenuation metric to alter components too quickly. Null controller 522 receives the output of comparator 518 and provides adaptive high pass FIR filters 506(1,2) with an attenuation signal and also provides the attenuation signal to amplifiers 524(1,2). Although Ioch and Iodc can be directly compared (to determine the existence of a narrowband interferer), for the example herein we use the following equation: Iosig=Ioch−Iodc. The magnitude of the input signals will vary, thus, the difference between Iosig and Iodc will vary base upon their signal strength. Typically, to remove Iosig and Iodc dependence on absolute powers, the integrated magnitudes are converted to dB by using logarithms or normalized by dividing one by the other. Because determining dB and dividing can be costly, an embodiment provides a method that is robust yet low complexity. That is, the output of the comparator can be implemented as a single bit, hard decision. For example, the hard decision can be based on a threshold such that if the signal representing the interference input to the comparator is greater than the threshold, it is assumed that there is interference at DC, and a high pass filter is required to cancel the DC interference. If the interference is below the threshold, it is assumed that the interference has not reached a level that would require blocking DC signals. Such an architecture can be implemented using simple multiplexers as switches and simple high pass filters for applying to the real and quadrature components.

FIG. 5 illustrates adaptive high pass FIR filters 506(1,2), which require normalization to provide a multi-bit output. According to an embodiment, normalization is achieved by multiplying both signals Iosig and Iodc by q[n], where q[n] is calculated as follows (b being the bit width of Iosig and Iodc):

$$q[n] = \left\lfloor \frac{2^b - 1}{\max(Iodc[n], Iosig[n])} \right\rfloor_{base2}$$

In base 2 mathematics, the method of normalization using equation 4 is accomplished in the example providing that Iodc is greater than Iosig by adjusting Iodc to full scale and then shifting Iosig by the same amount as Iodc. Although the normalization is of low complexity, there is a decrease in accuracy. Since the signals are normalized by the most significant bit, a maximum error of 3 dB is assumed acceptable.

As illustrated, the architecture illustrated in FIG. 2 provides a low cost, low power and high performance method to solve narrowband interference problems for interference at DC by reducing the complexity of the architecture and using the stopband attenuation information determined in the soft metric generator and not the center frequency information. For IMD located at DC, the center frequency information is not necessary. Thus, FIG. 5 illustrates a reduced version of the architecture described with reference to FIG. 2.

Figure 6:
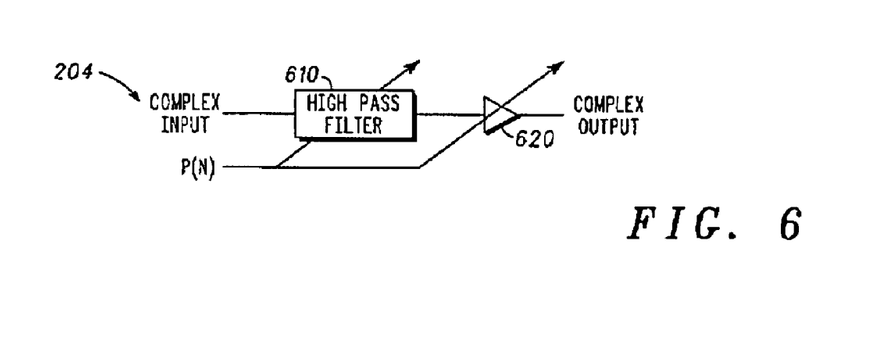
FIG. 6 is a block diagram illustrating an exemplary adaptive FIR filter in accordance with an embodiment of the present invention.

Referring now to FIG. 6 in combination with FIG. 2, an exemplary adaptive FIR filter 204 is illustrated. An embodiment uses the output p(n) from the soft decision generator 210 to adapt high pass filter 204(1). The adaptation can be done by dynamically updating the center tap of the FIR filter, which will adjust the baseband attenuation. Filter 204(1) receives both the complex quadrature input Q_IN and p(n) at high pass FIR filter 610. The filtered quadrature signal with attenuation within the stopband is adjusted according to p(n) is received by gain stage 620. Gain stage 620 adjusts the output of filter 610 also according to p(n) to adjust the gain of the filter due to the change in attenuation.

P(n) will adjust the center tap of the coefficients and adjust a gain stage following the filter. The coefficients of an N tap high pass FIR can be represented as follows:

$$c_0, c_1, c_2, \ldots, c_{\frac{N-1}{2}}, \ldots, c_{N-2}, c_{N-1}$$

In the example illustrated above, with p(n) varying from 0 to 4, an adaptation of the filter can be done by adjusting the center tap as follows:

k is the desired step size for the center tap and p(n) is the threshold level at the output of multi-bit comparator 412 shown in FIG. 4.

According to a reduced complexity embodiment, the null of adaptive FIR filter 208(1), the height of the center tap, can be adjusted to meet worst case conditions only. More particularly, rather than an "adaptive" FIR filter, in the reduced complexity $$c_{\frac{N-1}{2},n} = c_{\frac{N-1}{2}} + k(\max(p(n)) - p(n))$$

embodiment, p(n) is implemented as a hard decision, with two values 1=on, 0=off. In comparison, other embodiments provide a more optimal method by using is to use an adaptive FIR which has variable attenuations based upon the relative integrated magnitudes of the desired WCDMA and the IP2 interference.

Figure 7:
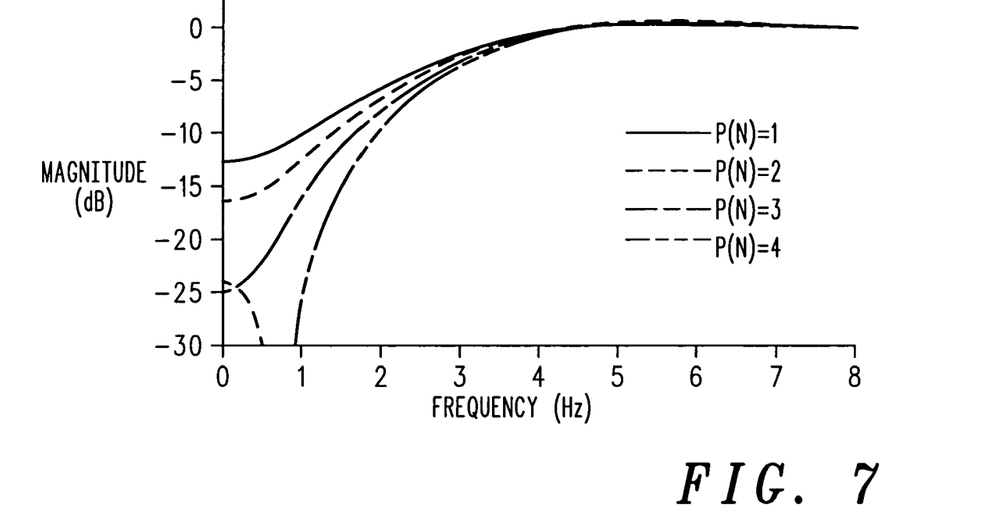
FIG. 7 is a spectral plot illustrating an exemplary output of an adaptive version of a high pass filter in the narrowband interference suppression system in accordance with an embodiment of the present invention.

The following example further illustrates the invention but, of course, should not be construed as in any way limiting its scope. Referring now to FIG. 7, an embodiment illustrated shows the spectral plot as p(n) is varied in an adaptive version of high pass filter 218(1) that sets the variables k, with the steps shown in the example with p(n) varying from 1 to 4, and the thresholds based upon predetermined specifications of an analog integrated circuit.

In the example, an adaptive FIR filter 218(1) has k equal to 0.125 and p(n) varies from 1 to 4. Note that p(n)=0 means that the high pass filter is not used in the signal path. The coefficients for this specific case are:

$$c(0,1,2,22,23,24)=-2^{-6} \ (=-0.0156250)$$

$$c(3,4,20,21)=-2^{-5} \ (=-0.03125)$$

$$c(5,6,7,17,18,19)=-2^{-4}+2^{-6} \ (=-0.046875)$$

$$c(8,9,10,11,13,14,15,16)=-2^{-4} \ (=-0.0625)$$

$$c(12)=2^{0}-2^{-4}+(4-p(n))*2^{-3} \ (=0.9375+0.125*(4-p(n)))$$

As shown in FIG. 7, the pass band remains relatively constant and the group delay remains flat. As is known, in digital signal processing, a variable symmetric FIR filter will achieve a flat group delay. Although IIR filters can achieve a similar response with a lower order, IIR filters typically have poor group delay around the null. In communication receivers it is highly desirable to have a flat group delay and a variable FIR to accommodate this need.

Table 1, below, illustrates the high pass filter attenuation of IP2 interference as the center tap varies by p(n):

TABLE 1

| p(n) | Attenuation of Edge Squared Interference |
|---|---|
| 0 | 0 dB |
| 1 | 8.2 dB |
| 2 | 12.3 dB |
| 3 | 19.7 dB |
| 4 | 22.3 dB |

As will be appreciated by those of skilled in the art with the benefit of this disclosure, a varying p(n) permits optimization of the attenuation on the IP2 interference while maintaining the maximum signal strength of the desired WCDMA signal. For example, if presented with an interference at sensitivity +3 dB using 22.3 dB of attenuation, the high pass filter over attenuates the desired signal thereby reducing the signal to noise ratio. Using an adaptive filter, such as illustrated as filter 218(1) disclosed herein, p(n) would be set to 1 and the attenuation would be 8.2 dB. These additional steps allow a better resolution and thus will reduce the overall bit error rate degradation and improve (improve the C/I) as the interference becomes weaker.

Figure 8:
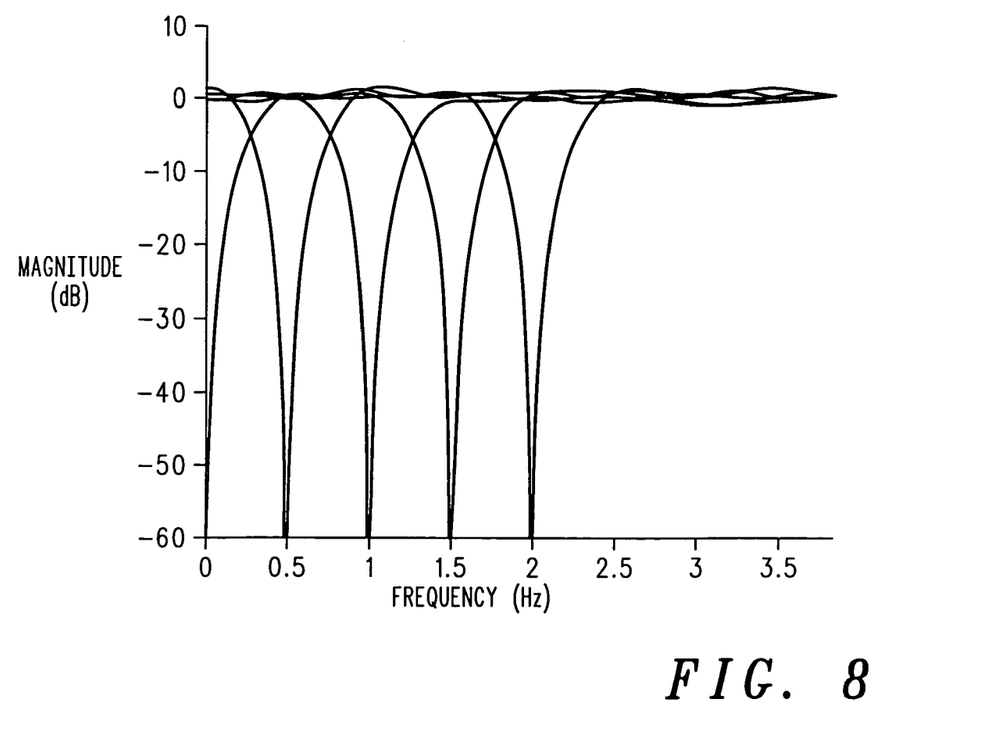
FIG. 8 is a spectral plot exemplifying varying center frequencies of an adaptive bandpass filter in accordance with an embodiment of the present invention.
Figure 9:
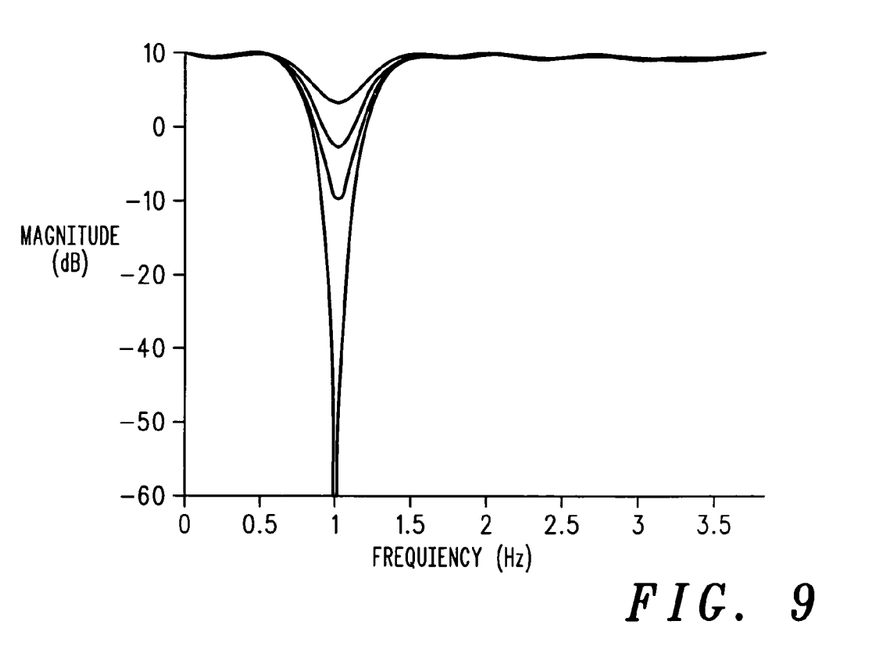
FIG. 9 is a spectral plot exemplifying varying amounts of stopband attenuation in an adaptive bandpass filter in accordance with an embodiment of the present invention.

As described above, a high performance, low cost, low power method and system removes narrowband interferences. In summary, the method requires at least two components. A first component provides control by determining what the attenuation and center frequency of an adaptive filter should be. Referring to FIG. 8, for example, a spectral plot illustrates the center frequency selection by adjusting filter taps except for the center tap of an adaptive bandpass FIR filter. FIG. 9 illustrates stopband attenuation by illustrating adjusting the center tap of an adaptive bandpass FIR filter.

A second component is an FIR filter that provides high pass filtering. For the special case relating to 3G UMTS, and like systems wherein the main interference is IMD due to an EDGE squared signal, such as those signals improperly filtered by the analog block in a receiver, an embodiment provides greatly reduced complexity. More specifically, the filter bank can be reduced to include a single low pass filter since there is no need to determine the center frequency of the interference. In addition, the adjustment to the filter is simple because only the center tap needs to be adjusted. For an adjustment to the center frequency, all the other taps need to be modulated, such as multiplying by a constant multiplied by a cosine function. As described, using an FIR filter is beneficial to insure a relatively constant group delay in the digital receiver. Thus, as disclosed, an FIR filter adaptively changes the corner of the FIR filter with a low level of cost and complexity while maintaining constant group delay.

Figure 10:
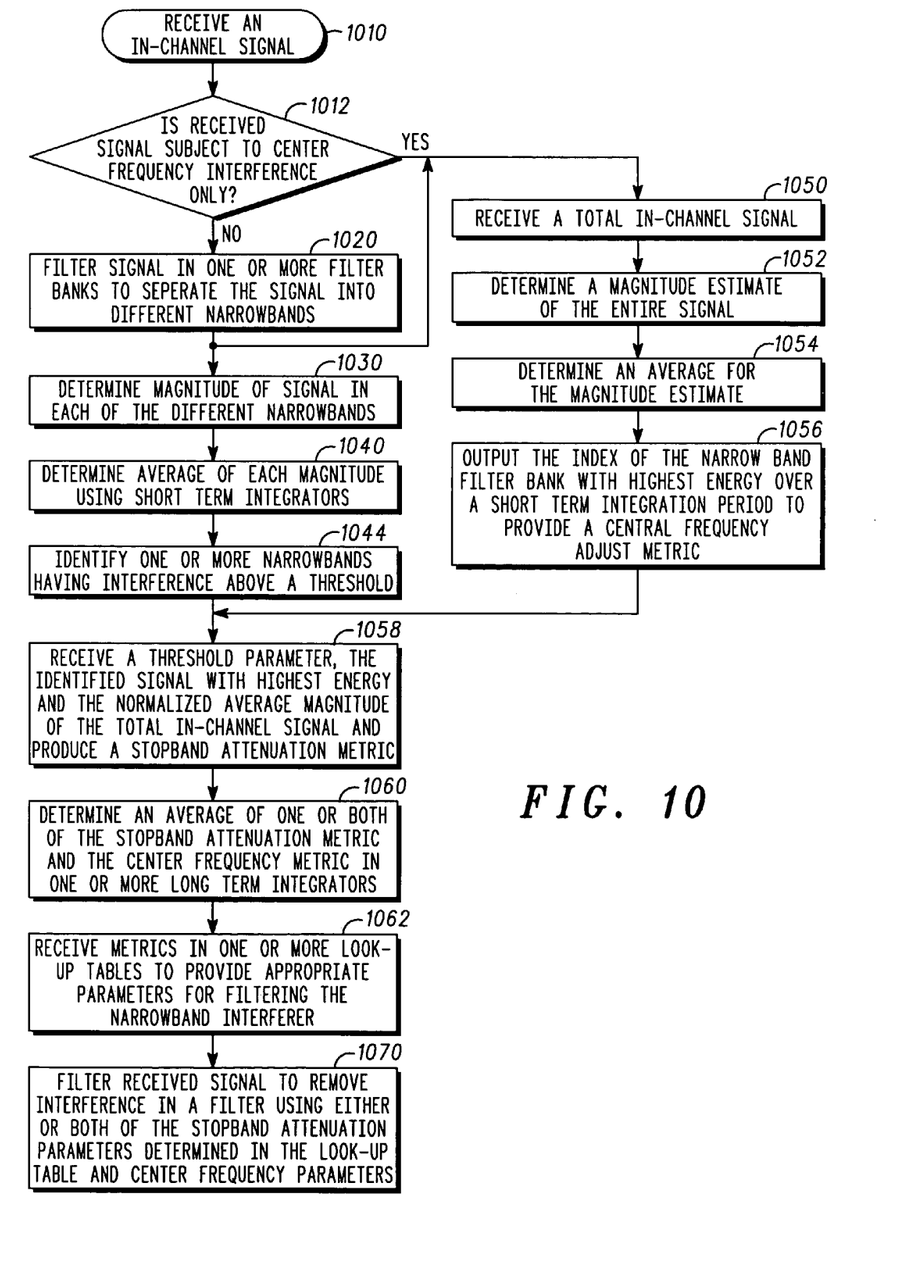
FIG. 10 is a flow diagram illustrating a method in accordance with an embodiment of the present invention.

Referring now to FIG. 10 in combination with FIGS. 2, 3, 4 and 5, a flow diagram illustrates the method involving the two components in more detail. As shown, the method begins with block 1010, which provides for receiving an in-channel signal, the signal including quadrature and real signal components. Block 1012 provides a decision block wherein the received signal is identified as one of subject to center frequency interference only. If so, the method is directed to perform by applying a reduced architecture. If not, the method is directed to Block 1020, which provides for filtering the signal in one or more filter banks. The filter banks separate the signal into different channels, which can be a plurality of narrowbands. After the narrow bands are determined in filter banks, at least one of the plurality of narrowbands as subject to interference. More particularly, identifying a band subject to interference includes, in block 1030, estimating the magnitude of each signal associated with each separated band, and then, in block 1040, determining an average magnitude for each signal using short term integrators. The averaged magnitude of each of the narrow band signals is used to identify, in block 1044, the one or more narrowbands having interference above a threshold.

Block 1050 provides for receiving a total in-channel signal and, without applying a filter bank. Block 1050 applies whether or not, in decision block 1012, it is determined if interference is present at a center frequency. Block 1052 provides for determining a magnitude estimate of the entire signal and block 1054 provides for determining an average magnitude estimate of the entire signal in a short term integrator. Following the short term integrator, the gain of the averaged magnitude of the signal can be altered to match that of the average magnitude output from short term integrators of block 1040.

The averaged magnitude estimates from block 1054 and block 1040 are received in a soft metric decision generator to provide one or more metrics to enable dynamic alteration of characteristics for filtering the identified narrowband interference. More particularly, block 1056 directs outputting the index of the narrow band filter bank which exhibits the highest energy over a specified short term integration period to provide a central frequency adjust metric.

Block 1058 provides for receiving a threshold parameter, the identified signal with highest energy and the normalized average magnitude of the total in-channel signal and producing a stopband attenuation metric. The component that determines the stopband attenuation metric can be efficiently cost-effectively determined using shifters and comparators.

Block 1060 provides for determining an average of one or both of the stopband attenuation metric and the center frequency metric in one or more long term integrators. The output including the stopband attenuation metric and center frequency metric is received according to block 1062 in respective look-up tables, which provides a table of appropriate parameters for filtering the narrowband interferer.

Block 1070 provides for filtering the received signal to remove interference in a filter using either or both of the stopband attenuation parameters determined in the look-up table and center frequency paramters. If, in block 1012, interference is not present in a center frequency, then the filtering can use both types of parameters. If, in block 1012, interference is present only in a center frequency, the filtering can use only stopband attenuation parameters. As described above, the filtering can be performed by an adaptive bandpass FIR filter to performing different types of narrowband interference, whether it is center frequency interference or narrowband interference spanning a wideband channel. In some embodiments, the filtering can be performed by an IIR filter, and the like, when interference is center frequency interference.

As illustrated in FIG. 10 and in FIG. 2, embodiments described herein include an interference cancellation system that considers the most general interference case i.e. N unknown interferences at N unknown frequencies. In an embodiment, for example, the interference cancellation system can detect N interferences, estimate N interference center frequencies, and estimate N appropriate attenuations. The N center frequencies and N attenuations can create N soft metrics to be used to create N band pass filters.

In less general cases, such as those appropriate to more practical scenarios, one of skill in the art with the benefit of this disclosure will appreciate that improvements directed to the more practical scenarios are within the scope of the embodiments described. More specifically, referring to FIG. 2, one of skill in the art appreciates that there can be (1:$n$) adaptive band pass FIR filters or IIR filters configured in series to attenuate 1:$n$ interferences. The bandpass filters can be adjusted by (1:$n$) soft metric center tap adjustments and (1:$n$) soft metric frequency adjustment. Thus, embodiments encompass using, for example, one filter to attenuate ten unknown interferences at ten unknown frequencies, but if for example, two interferences at known frequencies are more likely to cause interference, embodiments also provide for having two filters with two soft metric center tap adjustments and no frequency adjustments. Similarly, the detection/estimation procedure can be optimized if and when variables can be replaced with constants.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A narrowband interference cancellation system comprising:
    a narrowband processing component configured to receive a signal and identify one or more narrowband interferers in the received signal, the narrowband processing component including a filter bank configured to separate the received signal into a predetermined number of channel bands;
    a wide band processing component coupled to receive both real and quadrature components of the received signal, the wide band processing component configured to provide an average level for an unfiltered version of the received signal;
    a soft decision metric generator coupled to both the narrowband processing component and the wide band processing component, the soft decision metric generator configured to produce metrics based on predetermined thresholds; and
    a filter component configured to receive coefficients from the soft decision metric generator, the filter component configured to cancel the one or more narrowband interferers;
wherein the filter bank is coupled to a plurality of magnitude estimators configured to determine a magnitude estimate for each of the separate channel bands.

2. The narrowband interference cancellation system of claim 1 wherein the plurality of magnitude estimators are coupled to a plurality of short term integrators configured to determine an average magnitude associated with each of the separate channel bands.

3. The narrowband interference cancellation system of claim 1 wherein the soft decision metric generator produces one or more of a center frequency metric and a stopband attenuation metric for use by the filter component, the center frequency metric providing a center frequency of a narrowband interferer, the stopband attenuation metric providing an amount of stopband attenuation necessary for the narrowband interferer.

4. The narrowband interference cancellation system of claim 1 wherein the filter component is an adaptive bandpass finite impulse response (FIR) filter with filter taps determined by the soft decision metric generator.

5. The narrowband interference cancellation system of claim 1 wherein the filter component is a high pass filter with stopband attenuation determined by the soft decision metric generator.

6. The narrowband interference cancellation system of claim 4 wherein the soft decision metric generator determines a center frequency and stopband attenuation to enable the adaptive bandpass FIR filter to remove narrowband interference.

7. The narrowband interference cancellation system of claim 4 further comprising:
at least one long term integrator coupled to the soft decision metric generator, the long term integrator configured to provide an average for any metrics output from the soft decision metric generator, the long term integrator.

8. The narrowband interference cancellation system of claim 7 wherein the long term integrator operates the metrics output from the soft decision metric generator to avoid rapid changes in the coefficients to be used in adaptive bandpass FIR filters.

9. The narrowband interference cancellation system of claim 1 further comprising one or more filler coefficient storage components coupled to the filter component, the filter coefficient storage components providing filter coefficients for the filter component.

10. The narrowband interference cancellation system of claim 9 wherein the one or more filter coefficient storage components include one or more look up tables.

11. The narrowband interference cancellation system of claim 1 further comprising one or more coefficient generation components coupled to the filter component, the coefficient generation component dynamically generating filter coefficients for the filter component using one or more known signal processing methods.

12. The narrowband interference cancellation system of claim 11 wherein the known signal processing method includes minimizing a mean-squared error method.

13. The narrowband interference cancellation system of claim 1 further comprising one or more look up tables coupled to the filter component, the look up tables providing tables of filter coefficients for the filter component.

14. The narrowband interference cancellation system of claim 1 further comprising one or more look up tables coupled to the filter component, the look up tables providing tables for providing a center tap for the filter component.

15. The narrowband interference cancellation system of claim 1 wherein the soft decision metric generator is configured to produce a center frequency adjust soft metric, the center frequency adjust soft metric providing a center frequency for a narrowband subject to interference thereby enabling the filler component to filter the narrowband interference.

16. The narrowband interference cancellation system of claim 15 wherein the soft decision metric generator includes a multi-bit comparator configured to determine which frequency band has a maximum average magnitude and output an index identifying the frequency band with a maximum average interference.

17. The narrowband interference cancellation system of claim 1 wherein the soft decision metric generator includes a normalization component that normalizes a total on-channel signal magnitude parameter with an interference magnitude parameter and produces an output that provides an amount by which stopband attenuation is necessary.

18. The narrowband interference cancellation system of claim 1 wherein the wide band processing component includes a magnitude estimator and a short term integrator, the magnitude estimator configured to determine the magnitude of the total in-channel received signal, the short term integrator providing an average magnitude to provide to the soft decision metric generator.

19. The narrowband interference cancellation system of claim 1 wherein the type of interference cancelled includes second order intermodulation distortion (IMD2), third order intermodulation distortion (IMD3), Advanced Mobile Phone System (AMPS) interference, Global System for Mobile Communications (GSM) interference and Enhanced Data for GSM Evolution (EDGE) interference.

20. The narrowband interference cancellation system of claim 1 wherein the filter component includes at least two adaptive finite impulse response (FIR) filters configured to receive soft metrics from the soft decision metric generator.

21. A method for canceling narrowband interference in a wide bandwidth receiver, the method comprising:
receiving an in-channel signal, the signal including quadrature and real signal components;
filtering the signal in one or more filter banks, the filter banks separating the signal into a plurality of narrowband signals;
identifying at least one of the plurality of narrowband signals as subject to interference;
generating one or more metrics to enable dynamic alteration of characteristics for filtering the identified narrowband signal; and
filtering the identified narrowband signal;
wherein the metrics are generated in a soft decision metric generator that is coupled to receive an average magnitude associated with each of the separate narrowband signals.

22. The method of claim 21 wherein the identifying the plurality of narrowband signals further comprises:
determining a result of applying a function of magnitude to each of the narrowband signals; and
determining an average of the results fat the plurality of narrowband signals using a plurality of short term integrators.

23. The method of claim 22 wherein the function of magnitude is one or more of the magnitude and a magnitude squared function.

24. The method of claim 22 wherein the short term integrators detect any high slew rate narrowband interferers.

25. The method of claim 21 wherein the generating metrics is performed by a soft metric decision generator configured to receive one or more thresholds and provide a soft stopband attenuation metric and a center frequency metric.

26. The method of claim 21 wherein the plurality of narrowbands are received by a plurality of magnitude estimators configured to determine a magnitude estimate for each of the separate narrowband signals.

27. The method of claim 21 wherein the soft decision metric generator is coupled to receive the average magnitudes from a plurality of short term integrators configured to determine an average magnitude associated with each of the narrowband signals.

28. The method of claim 21 wherein the soft decision metric generator produces one or more of a center frequency metric and a stopband attenuation metric for use by an adaptive bandpass FIR filter to perform the filtering, the center frequency metric providing a center frequency of a narrowband interferer, the stopband attenuation metric providing an amount of stopband attenuation necessary for the narrowband interferer.

29. The method of claim 21 wherein filter taps for filtering are determined by the soft decision metric generator.

30. The method of claim 21 further comprising:
averaging an output of the soft decision metric generator in a long term integrator configured to provide an average for any metrics output from the soft decision metric generator.

31. The method of claim 30 wherein the long term integrator operates on metrics output from the soft decision metric generator to avoid rapid changes in coefficients to be used in adaptive bandpass FIR filters.

32. The method of claim 21 further comprising:
receiving metrics from the soft decision metric generator in one or more look up tables, the look up tables determining appropriate filter coefficients to enable filtering to remove narrowband interference.

33. A method for removing narrowband interference perform by a digital signal processor having digital hardware, the method comprising:
receiving an in-channel signal, the signal including quadrature and real signal components;
filtering the signal in one or more filter banks, the filter banks separating the signal into a plurality of narrowband signals;
identifying at least one of the plurality of narrowband signals as subject to interference;
generating one or more metrics to enable dynamic alteration of characteristics for filtering the identified narrowband signal; and
filtering the identified narrowband signal;
wherein the filtering is performed by one of a high pass filter or a band pass filter, the high pass filter operable when the narrowband interference is a low frequency interferer; and wherein the metrics are generated in a soft decision metric generator that is coupled to receive an average magnitude associated with each of the separate narrowband signals.

34. The method of claim 33 further comprise:
determining a result of applying a function of magnitude to each of the narrowband signals; and
determining an average of the results for the plurality of narrowband signals using a plurality of short term integrators.

35. The method of claim 33 wherein the generating metrics is performed by a soft metric decision generator configured to receive one or more thresholds and provide a soft stopband attenuation metric and a center frequency metric.

36. The method of claim 33 wherein the metrics are generated in a soft decision metric generator that is coupled to receive an average magnitude or function of magnitude associated with each of the separate narrowband signals and an average magnitude or function of magnitude associated with a total in-channel received signal, the average magnitudes or functions of magnitude determined at least in part by a plurality of short term integrators, the soft decision metric generator producing one or more of a center frequency metric and a stopband attenuation metric for use by one of an adaptive bandpass FIR filter or a high pass filter to perform the filtering, the center frequency metric providing a center frequency of a narrowband interferer, the stopband attenuation metric providing an amount of stopband attenuation necessary for the narrowband interferer.

37. The method of claim 33 wherein the metrics are generated in a soft decision metric generator that is coupled to receive an average magnitude or function of magnitude associated with each of the separate narrowband signals and an average magnitude or function of magnitude associated with a total in-channel received signal, the average magnitudes determined at least in part by a plurality of short term integrators, the soft decision metric generator producing a stopband attenuation metric for use by a bandpass IIR filter to perform the filtering, the stopband attenuation metric providing an amount of stopband attenuation necessary for the narrowband interferer.

* * * * *